(12) United States Patent
Kraetzig

(10) Patent No.: US 9,379,596 B2
(45) Date of Patent: Jun. 28, 2016

(54) WORK APPARATUS

(71) Applicant: Andreas Stihl AG & Co. KG, Waiblingen (DE)

(72) Inventor: David Kraetzig, Ludwigsburg (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 512 days.

(21) Appl. No.: 13/859,144

(22) Filed: Apr. 9, 2013

(65) Prior Publication Data
US 2013/0270933 A1    Oct. 17, 2013

(30) Foreign Application Priority Data
Apr. 16, 2012   (DE) .......................... 10 2012 007 405

(51) Int. Cl.
| | | |
|---|---|---|
| *H02K 7/14* | (2006.01) | |
| *H02K 9/06* | (2006.01) | |
| *H02K 9/28* | (2006.01) | |
| *A01D 34/90* | (2006.01) | |

(52) U.S. Cl.
CPC *H02K 9/28* (2013.01); *A01D 34/90* (2013.01); *H02K 7/145* (2013.01); *H02K 9/06* (2013.01)

(58) Field of Classification Search
CPC ........... H02K 9/28; H02K 9/06; H02K 7/145; A01D 34/90
USPC ............. 310/50, 227, 154.03, 58, 59; 30/276, 30/165, 286; 56/10.1
IPC ........................................ H02K 7/14, 9/06, 9/28
See application file for complete search history.

(56) References Cited

U.S. PATENT DOCUMENTS

| | | | | |
|---|---|---|---|---|
| 2,033,939 | A * | 3/1936 | Jeppsson ................... | B26D 7/12 30/139 |
| 3,083,457 | A * | 4/1963 | Ottosen ................... | A01G 3/053 30/216 |
| 3,221,481 | A | 12/1965 | Mattson et al. | |
| 3,540,123 | A * | 11/1970 | Kunimi ................ | A01D 34/902 173/30 |
| 3,759,019 | A * | 9/1973 | Wells .................... | A01D 34/475 310/91 |
| 4,342,929 | A * | 8/1982 | Horne .................... | H02K 1/185 310/43 |
| 4,908,538 | A * | 3/1990 | Geberth, Jr. .............. | H02K 5/20 310/227 |
| 5,071,069 | A * | 12/1991 | Stirm .................... | B05B 9/0861 239/128 |
| 5,933,966 | A * | 8/1999 | Yates ..................... | A01D 34/90 30/276 |
| 6,301,788 | B1 | 10/2001 | Webster | |
| 6,904,977 | B2 | 6/2005 | Zerrer et al. | |
| 2008/0092398 | A1 * | 4/2008 | Hurley ................. | A01D 34/905 30/276 |

(Continued)

FOREIGN PATENT DOCUMENTS

| | | |
|---|---|---|
| DE | 1 041 660 B | 10/1958 |
| DE | 203 16 737 U1 | 12/2003 |

(Continued)

*Primary Examiner* — John K Kim
(74) *Attorney, Agent, or Firm* — Walter Ottesen, P.A.

(57) ABSTRACT

A work apparatus has a tool which is driven in rotation by a drive motor via a transmission. The drive motor is an electric motor which has a commutator and brushes. The drive motor is arranged in a motor housing and drives an impeller wheel which conveys a cooling airflow for the drive motor. Simple and effective lubrication of the transmission is achieved with the cooling airflow flowing past the commutator and brushes and the transmission is arranged downstream of the commutator in the cooling airflow. The motor housing is formed in a manner closed toward the transmission housing on that end side that faces the transmission housing and is connected to the transmission housing via a flow connection.

21 Claims, 3 Drawing Sheets

(56) References Cited

U.S. PATENT DOCUMENTS

| | | | | |
|---|---|---|---|---|
| 2009/0090094 A1* | 4/2009 | Million | A01D 34/90 | 56/13.4 |
| 2011/0131815 A1* | 6/2011 | Hurley | A01D 34/90 | 30/276 |
| 2011/0241457 A1* | 10/2011 | Muller | A01D 34/902 | 310/50 |
| 2011/0247220 A1* | 10/2011 | Whited | B26B 25/002 | 30/276 |
| 2012/0104983 A1* | 5/2012 | Tanimoto | A01D 34/78 | 318/400.22 |

FOREIGN PATENT DOCUMENTS

| | | | | |
|---|---|---|---|---|
| DE | 297 24 791 U1 | 4/2004 | | |
| EP | 1 637 288 A1 | 3/2006 | | |
| JP | 06062637 A  * | 3/1994 | | A01D 34/68 |
| JP | WO 2011039978 A3  * | 5/2012 | | A01D 34/78 |
| SU | 857558 A1 | 8/1981 | | |
| WO | 2008/028714 A1 | 3/2008 | | |

* cited by examiner

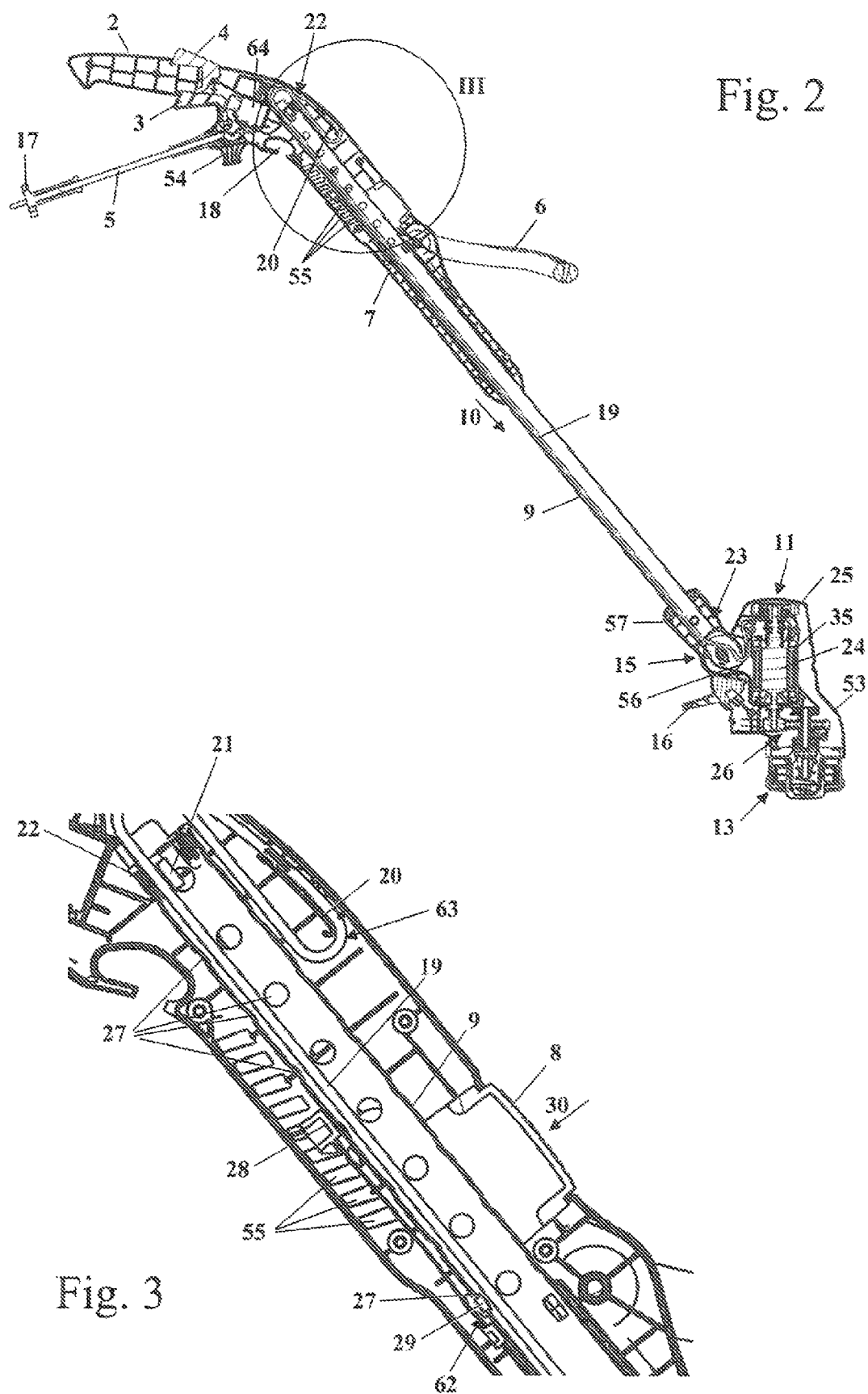

WORK APPARATUS

CROSS REFERENCE TO RELATED APPLICATION

This application claims priority of German patent application no. 10 2012 007 405.0, filed Apr. 16, 2012, the entire content of which is incorporated herein by reference.

BACKGROUND OF THE INVENTION

Work apparatuses that are driven by electric motor, for example brush cutters, lawnmowers or the like, are well known. Usually, the tool is driven by the drive motor via a transmission. In order to cool the drive motor, a fan impeller which guides a cooling air flow through the motor housing of the work apparatus is provided. A work apparatus of this type, specifically a brush cutter, is known from JP 06-062537 A.

It is known practice to encapsulate the transmission with respect to the drive motor and to provide in the transmission housing a grease filling which is intended to ensure sufficient grease lubrication over the service life of the transmission. The transmission should be encapsulated in a liquid-tight manner in order to prevent lubricant being lost. This results in a complicated structure of the transmission.

In order to be able to dispense with grease lubrication, it is also known practice to produce plastics gearwheels having additives, for example Teflon, which effect good lubrication. However, gearwheels of this type are comparatively expensive.

SUMMARY OF THE INVENTION

It is an object of the invention to provide a work apparatus of the type described above, which has a simple structure and a long service life.

The work apparatus of the invention includes: a work tool; a transmission; an electric drive motor for rotatably driving the work tool via the transmission; a motor housing defining a flow path for conducting a cooling airflow therealong; the drive motor being mounted in the motor housing and having a coil and a commutator assembly including a commutator and brushes; a fan wheel driven by the drive motor and the fan wheel being configured to move the cooling airflow over the coil and the commutator assembly during operation; the motor housing having an exit opening for passing the cooling airflow out from the motor housing; the exit opening being arranged in the flow path downstream of the commutator assembly; a transmission housing; the motor housing having an end facing toward the transmission housing and the motor housing being configured to be closed off at the end thereof; a flow connection connecting the motor housing to the transmission housing and configured to conduct at least a portion of the cooling airflow into the transmission housing; and, the transmission being arranged in the cooling airflow through the transmission housing.

It has been shown that, instead of the known grease lubrication of the transmission, dry lubrication is sufficient when the graphite or carbon dust from the brushes of the commutator is used as lubricant. As a rule, the brushes of a commutator consist substantially of graphite, to which it is possible to add small quantities of further constituents. Instead of encapsulating or shielding the transmission with respect to the drive motor, it is provided for the cooling air flow to be conveyed in a targeted manner past the commutator and subsequently past the transmission in order in this way to convey the carbon dust from the commutator in a targeted manner to the transmission and to lubricate the transmission with the carbon dust. It has surprisingly been shown that this lubrication is sufficient for the transmission and noticeably increases the service life of the transmission compared with an unlubricated transmission.

In order to ensure sufficient lubrication of the transmission immediately after production, it may be practical to carry out start-up lubrication of the transmission, that is, to provide initial filling of the transmission with a specified amount of grease. Since lubrication of the transmission via the carbon dust or graphite dust from the brushes is ensured only after a particular operating time, the grease filling introduced into the transmission bridges the operating period between the first starting up of a new work apparatus and the necessary operating time, after which lubrication is ensured solely by the carbon dust or graphite dust from the brushes. In this case, the grease located in the transmission ensures that the carbon dust or graphite dust is bound, thereby improving the retention of the carbon dust or graphite dust in the transmission. The initial grease filling thus ensures not only initial lubrication of the transmission, but also binds the carbon dust or graphite dust entrained in the air flow, and as a result improved lubrication is also achieved over the long term.

Because the motor housing is formed in a manner closed toward the transmission housing on that end side that faces the transmission housing, it is possible at the same time to prevent contaminants from the region of the work tool and the transmission from being able to pass back toward the drive motor. As a result, the motor housing having the drive motor is also prevented from liquid ingress. In particular, the motor housing is closed in a sealed manner with respect to the transmission housing on that end side that faces the transmission housing, and as a result the drive motor is protected against liquid ingress even when the work apparatus with its transmission is dipped into liquid, for example water.

Advantageously, in operation, the cooling air flow first flows past the coil and subsequently past the commutator. This avoids carbon dust being able to be transported by the air flow to the coil and to the rotor of the drive motor. The air flow in this case flows advantageously from the coil to the commutator in a first flow direction and flows in the flow connection in a second flow direction opposite to the first flow direction. As a result of the two opposite directions of flow in the motor housing and in the flow connection, effective cooling of the drive motor is achieved. Heat can be dissipated effectively both from the motor housing and from the flow connection via the cooling air. Furthermore, the penetration of contaminants from the transmission housing into the motor housing is further hindered by the deflection of the cooling air.

The exit opening is sir ranged advantageously as far away as possible from that end side of the motor housing that faces the transmission housing. The drive motor defines a first imaginary plane which extends perpendicularly to the rotation axis of the drive motor on that side of the commutator that faces the drive housing. The exit opening is arranged advantageously on that side of the first imaginary plane that is remote from the transmission housing. Accordingly, the cooling air flows into the flow connection above that side of the commutator that faces the transmission housing with respect to the usual working position of the work apparatus. The drive motor advantageously has a second imaginary plane which extends perpendicularly to the rotation axis of the drive motor on that side of the commutator that is remote from the transmission housing. The exit opening is arranged in particular on that side of the second imaginary plane that is remote from the transmission housing, that is, above that side of the commutator that is remote from the transmission housing. This advantageously ensures that the cooling air flows completely through the region of the commutator and carbon dust is picked up well by the cooling air flow and transported away to the transmission.

The flow connection of the motor housing with the transmission housing is advantageously a connecting duct. The average length of the connecting duct is advantageously at least about 5 cm, in particular at least about 10 cm. The connecting duct is accordingly not just in the form of an opening but has a comparatively long length. As a result, it is possible to effectively prevent the passage of contaminants from the transmission housing into the motor housing. The length of the connecting duct is advantageously less than about 25 cm. This ensures that the flow resistance because of the long duct length does not become excessively great. An average length of the connecting duct of about 12 cm has been found to be particularly advantageous.

Advantageously, the transmission is arranged on that side of the coil that, is remote from the commutator. This results in an advantageous arrangement of the drive motor and an advantageous flow direction of the air flow at the drive motor and in the flow connection to the transmission housing.

Particularly advantageously, the transmission has at least two gearwheels that are in engagement with one another and the teeth of which consist of plastics material. In the case of gearwheels made of plastics material, lubrication by way of the carbon dust from the brushes of the commutator is particularly advantageous. The gearwheels consist advantageously entirely of plastics material in order to achieve a low weight of the work apparatus. However, it is also possible to provide for the gearwheels to have a main body made of metal or some other material and only for the teeth to consist of plastics material. An advantageous arrangement is realized when the impeller wheel and transmission are arranged on opposite sides of the drive motor.

The impeller wheel is arranged advantageously next to the exit opening. In this way, targeted air guidance can be easily achieved. At the same time, an advantageous arrangement of the impeller wheel is realised. In this case, the impeller wheel is arranged in particular at least partially in the connecting duct. Advantageously, the impeller wheel is arranged downstream of the exit opening, in particular entirely in the connecting duct.

Advantageously, the work apparatus has a housing which is formed from at least two shells, wherein the motor housing, the transmission housing and the flow connection are formed by the two shells. The housing is in this case in particular a plastics injection-molded part. This produces a simple structure. In order to form the transmission housing, the motor housing and the flow connection, essentially only two shells are required.

Advantageously, the cooling air flow passes into the motor housing through at least one inlet opening and leaves the transmission housing through at least one outlet opening, wherein the outlet opening is formed between the rotationally driven tool and the transmission housing. Advantageously, a second impeller wheel is arranged on that side of the tool that faces the transmission housing. The second impeller wheel brings about particularly effective conveyance of the cooling air flow. The second impeller wheel can furthermore seal off the motor housing such that, in the case of a quickly rotating tool, there is only a small free gap between the motor housing and the tool. This prevents contaminants, in particular cut matter, from being able to pass into the motor housing. A sufficiently large outlet cross section for the cooling air is achieved via the impeller wheel. The cooling air blown out between the transmission housing and the tool also has the effect of blowing away dirt from the transmission housing.

Advantageously, the work apparatus has a shaft which connects the motor housing to a handle housing. Advantageously, cooling air is drawn into the motor housing via the shaft. As a result, the cooling air can be drawn in from a region that is remote from the tool and as a result is not contaminated with cut matter. The handle housing advantageously has at least one air inlet opening for cooling air. In order to achieve a sufficiently large flow cross section for the cooling air inlet, it is provided for the shaft to have shaft openings on its outer circumference in its section arranged in the handle housing, cooling air passing from the handle housing into the shaft via the shaft openings. Because the cooling air enters not only via the end side of the shaft, a guide for the electrical connecting lines of the drive motor can be arranged on the end side of the shaft. The guide can in this case largely close the end side of the shaft. A simple, robust structure is realised as a result, and damage to the cable by the shaft can be easily avoided.

Advantageously, the shaft is held displaceably in the handle housing. As a result, the length of the shaft can be adapted to the size of the user. In order to fix the shaft in at least two positions with respect to the handle housing, a locking device is advantageously provided. A simple structure is realised when the locking device interacts with at least one shaft opening.

In work apparatuses having a displaceable shaft, use is usually made of a spiral cable as the electrical connecting line, in order to easily allow length compensation when the length of the work apparatus is adjusted. However, a spiral cable noticeably reduces the shaft free cross section, over which the cooling air flows. Furthermore, a spiral cable considerably increases the weight of the work apparatus. In order not to substantially influence the free flow cross section, it is provided for the electrical connecting line to extend in at least one loop at that end of the shaft that projects into the handle housing in the fully pushed-together position of shaft and handle housing. When the shaft is pulled out of the handle housing, length compensation can easily be achieved as a result, without a spiral cable having to be used.

BRIEF DESCRIPTION OF THE DRAWINGS

The invention will now be described, with reference to the drawings wherein:

FIG. 2 shows a longitudinal section through the brush cutter of FIG. 1;

FIG. 3 is an enlarged view of detail III of FIG. 2;

DESCRIPTION OF THE PREFERRED EMBODIMENTS OF THE INVENTION

Figure 1:
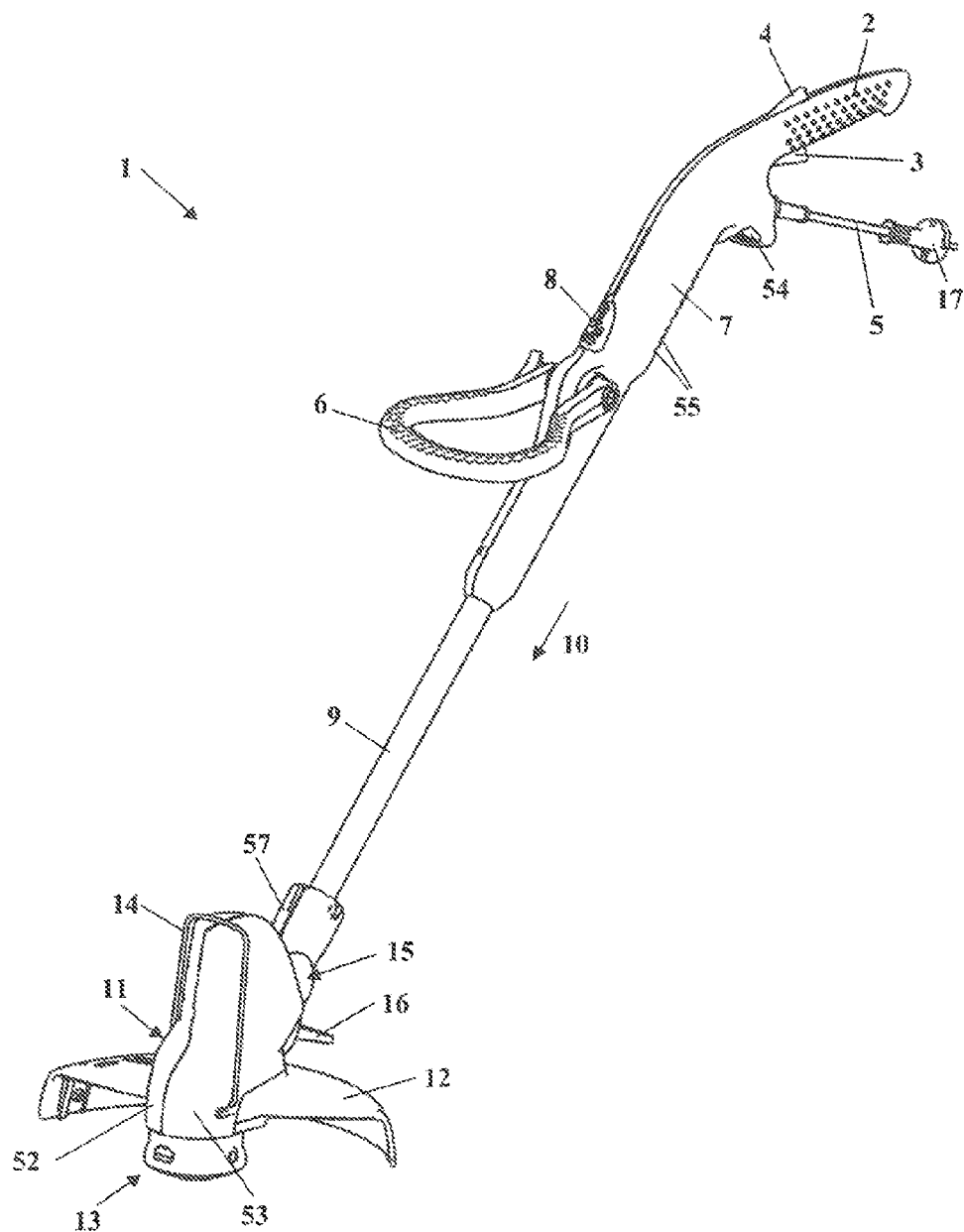
FIG. 1 is a perspective view of a brush cutter.

FIG. 1 shows a portable, handheld work apparatus, specifically a brush cutter 1, as an exemplary embodiment of a work apparatus. However, the present invention can also be used in other work apparatuses, in particular in portable work apparatuses such as lawnmowers or the like. The brush cutter 1 has a handle housing 7 on which a rear handle 2 is arranged. The handle housing 7 is composed, as a plastics injection-molded part, from two shells which also form the rear handle 2. A throttle lever 3 and a throttle lever lock 4 are pivotably mounted on the rear handle 2. An electrical connection cable 5 projects out of the handle housing 7, a connecting plug 17 being provided at the end of the cable 5. Formed on the handle housing 7 is a feedthrough 54, which is part of a strain relief device which will be described in more detail hereinafter. On its side that is directed downward in operation, the handle housing 7 has a multiplicity of air inlet openings 55. A bow-type handle 6 is pivotably mounted on the handle housing 7 in a lower region facing a shaft 9. Provided next to the mounting point of the bow-type handle 6 is an actuating button 8 for unlocking the position of the shaft 9.

FIG. 1 shows the brush cutter 1 in its fully pushed-together position, that is, in the position in which the handle housing 7 is at its shortest distance from a housing 11 arranged at the other end of the shaft 9. With the actuating button 8 pressed, the shaft 9 can be pulled out of the handle housing 7 in the direction of the arrow 10 and, as a result, the length of the brush cutter 1 can be increased or, when the shaft 9 is pushed into the handle housing 7, reduced. As a result, the length of the brush cutter 1 can be adapted to the size of an operator.

Fixed to the shaft 9 at the end remote from the handle housing 7 is a holding connection piece 57 on which the housing 11 is mounted via a pivot joint 15. The pivot joint 15 can be released via an actuating lever 16. As a result, the rotary position of the housing 11 on the shaft 9 can be changed.

As FIG. 1 shows, the housing 11 comprises two shells 52 and 53, which are formed as plastics injection-molded parts in the embodiment shown. The housing 11 can also be referred to as the apparatus housing. The two half shells 52 and 53 can conjointly form the motor housing 35, the transmission housing 70, and a flow connection, which can be configured as a connecting channel or duct 58. Mounted on the housing 11 is a pivotable protective bow 14 which can be flipped forward and downward from the position shown in FIG. 1 in order to protect the cutting filament (not shown in FIG. 1) that acts as a tool in operation. Arranged on the housing 11 on the side facing the operator is a guard 12 which covers the cutting filament (not shown in FIG. 1) in a conventional manner. A mowing head 13 is rotatably mounted on the housing 11.

As FIG. 2 shows, the shaft 9 has a first, upper end 22, which projects into the handle housing 7, and a second, lower end 23, which is fixed in the holding connection piece 57. As FIG. 2 also shows, the holding connection piece 57 is connected via an inlet opening 56 to the interior of the housing 11, specifically with a motor housing 35 arranged in the housing 11. Arranged in the motor housing 35 is a drive motor 24, on the top end of which there is arranged an impeller wheel 25 for conveying a cooling air flow for the drive motor 24. On the opposite end of the drive motor 24 there is arranged a transmission 26. Via the transmission 26, the drive motor 24 drives the mowing head 13 in rotation.

As FIG. 2 also shows, in the handle housing 7 there is arranged a control device 64 which connects the connection cable 5 to an electrical connecting line 19 guided through the shaft 9. The control device 64 may be a simple electrical switch, on which the throttle lever 3 acts. However, the control device 64 may also be a microprocessor-based controller or some other type of controller which controls the supply of electrical energy to the drive motor 24 and thus the rotational speed of the drive motor 24.

In operation, the connection cable 5 is connected via the connecting plug 17 to an electrical cable. In order to avoid the electrical connection of the electrical cable to the connecting plug 17 being broken when tension is applied to the electrical cable, a strain relief device, which is formed by the feedthrough 54 and a receptacle 18 formed, on the handle housing 7, is provided. The electrical connection cable 5 is inserted as a loop through the feedthrough 54 and is hooked into the receptacle 18 so that tensile forces on the electrical cable are absorbed substantially by the receptacle 18 and do not act on the plug-in connection of the electrical cable to the connecting plug 17.

As FIGS. 2 and 3 show, in the completely pushed-together position of the shaft 9 and the handle housing 7, the air inlet openings 55 are arranged next to the outer circumference of the shaft 9. On its outer circumference, the shaft 9 has shaft openings 27, which are in the form of circular openings in the exemplary embodiment. Four longitudinally extending rows of shaft openings 27, which are distributed at an equal spacing on the circumference of the shaft 9, are provided. Via the shaft openings 27, air which has been drawn into the interior of the handle housing 7 via the air inlet openings 55 passes into the shaft 9. The shaft openings 27 extend only over that region of the shaft 9 which is arranged entirely in the handle housing 7 in every provided position of the shaft 9, and so the shaft openings 27 are not arranged outside the handle housing 7 in any position of the shaft 9 and it is scarcely possible for contaminants to pass into the interior of the shaft 9 via the shaft openings 27.

As FIG. 3 shows, at the first end 22 of the shaft 9 there is arranged a guide 21, by way of which, the connecting line 19 is guided into the shaft 9. Since the cooling air is drawn in not only via the end side of the shaft 9, but predominantly via the shaft openings 27 distributed on the circumference, the guide 21 can largely or completely close the end side of the shaft 9 at the first end 22. In the position of the shaft 9 shown in FIGS. 2 and 3, the connecting line 19 is guided in a loop 63 on the outside of the shaft 9 next to the first end 22 of the shaft 9. Coming from the control device 64, the connecting line 19 is first of all guided into a region next to the shaft 9, that is, past the first end 22 of the shaft. Arranged on the handle housing 7 is a holder 20 which holds the connecting line 19 in the region next to the shaft 9. The connecting line 19 extends from the holder 20 back to the first end 22 and is guided there by the guide 21 into the interior of the shaft 9. If the shaft 9 is pulled out of the handle housing 7 in the direction of the arrow 10 (FIG. 2), the guide 21 moves in relation to the holder 20 until the connecting line 19 extends largely in a straight line in the completely pulled-out position of the shaft 9. Because the connecting line 19 is guided in a loop 63, resulting in an approximately S-shaped course of the connecting line 19, length compensation for the connecting line 19 can be easily provided.

As FIG. 3 also shows, the actuating button 8 can be pressed in an actuating direction 30 into the handle housing 7. The actuating button 8 is formed in one piece with a guide 28 which is arranged on that side of the shaft 9 that is opposite the actuating button, and also with a locking pin 29 which is likewise arranged opposite the actuating button. In the unactuated position of the actuating button 8, the locking pin 29 projects into a shaft opening 27 and as a result locks the shaft 9 in its position. The locking pin 29 thus forms a locking device 62 for the shaft 9. The spacings, formed in the longitudinal direction of the shaft 9, between the shaft openings 27 determine the steps in which the length of the brush cutter 1 can be changed.

Figure 4:
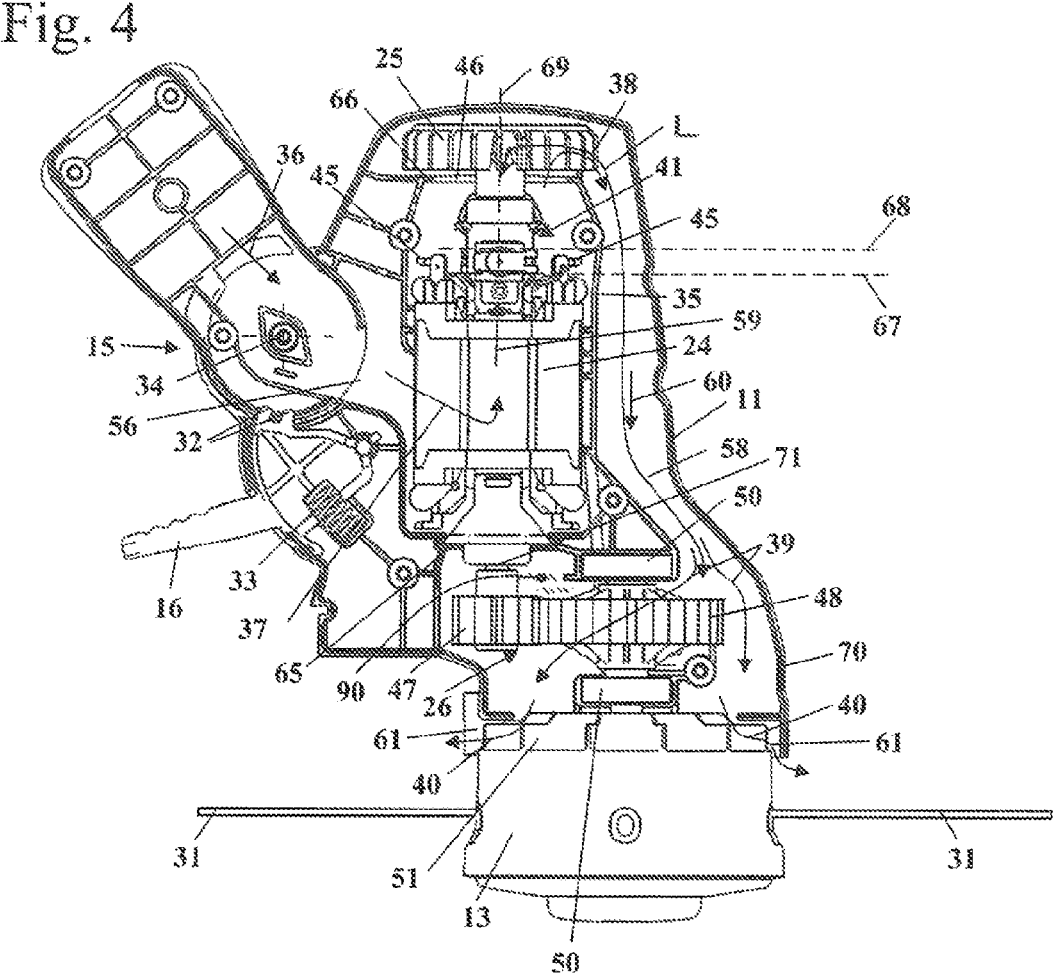
FIG. 4 is a schematic sectional view through the motor housing of the brush cutter; and, FIG. 5 is an enlarged sectional view of the upper region of the motor housing.

As FIG. 4 shows, the drive motor 24 has a driveshaft 71 which projects out of the motor housing 35 on a first end side 65 of the motor housing 35 and on a second, opposite end side 66. The exit opening 46 is arranged on the end side 66. On the end side 65, the motor housing 35 is formed in a closed manner, in particular in a substantially liquid-tight, and air-tight manner. In the shown usual operating position of the brush cutter 1, the first end side 65 is arranged beneath the second end side 66. The end sides 65 and 66 are in this case those sides of the motor housing 35 that extend approximately perpendicularly to a rotation axis 69 of the driveshaft 71 of the drive motor 24.

FIG. 4 shows the cooling air guide through the housing 11 in detail. The cooling air flows into the holding connection piece 57 through the second end 23 of the shaft 9 (FIG. 2), which is not shown in FIG. 4, and into the housing 11 through the inlet opening 56 via the pivot joint 15. In this case, the air flows out of the shaft 9 (FIG. 2) and into the pivot joint 15 in a flow direction 36 in the region of the pivot joint 15. Immediately after entering the housing 11, the cooling air passes into the motor housing 35, where it is deflected in the direction of the arrow 37, specifically upwardly in the usual working position, shown in FIG. 4, of the brush cutter 1. The cooling air flows past the drive motor 24 in a first flow direction 59. The first flow direction 59 is approximately parallel to the rotation axis 69 of the driveshaft 71 of the drive motor 24. The cooling air leaves the motor housing 35 next to the drive motor 24 at an exit opening 46, where the cooling air passes into a connecting duct 58. The cooling air flow flows at least partially, in particular largely completely via the exit opening 46 into the connecting duct 58. The connecting duct 58 connects the motor housing 35 to a transmission housing 70, in which the transmission 26 is arranged.

It is also possible for another flow connection between the motor housing 35 and the transmission housing 70 to be provided. In the connecting duct 58, the impeller wheel 25 is arranged immediately next to the exit opening 46 and to the end side 66 of the motor housing 35. At the impeller wheel 25, the cooling air is deflected in the direction of the arrow 38 and flows along the outer side of the motor housing 35 in a second flow direction 60 which is opposite to the flow direction 59 in the motor housing 35.

As FIG. 4 shows, the connecting duct 58 has, from the exit opening 46 to the transmission housing 70, an average length L which is at least about 5 cm. Advantageously, the average length is at least about 10 cm. The average length L is advantageously less than about 25 cm. The average length L of about 12 cm that is provided in the exemplary embodiment has been found to be particularly advantageous. The average length L is measured up to the entry into the transmission housing 70, that is, up to the point at which the flow cross section of the connecting duct 58 abruptly increases and the connecting duct 58 opens into the interior of the transmission housing 70. The average length L is the connecting line of the central points of all of the flow cross sections of the connecting duct 58 that are oriented perpendicularly to the flow direction.

On that end of the drive motor 24 that is opposite the impeller wheel 25 there is arranged a drive pinion 47 which is driven by the drive motor 24 and is advantageously connected to the driveshaft 71 of the drive motor 24 so as to rotate therewith. The drive pinion 47 is the input gearwheel for the transmission 26. The transmission housing 70 is arranged next to the end side 65 of the motor housing 35. The wall, arranged on the end side 65, of the motor housing 35 simultaneously bounds the transmission housing 70 and partitions the interior of the motor housing 35 from the interior of the transmission housing 70. The drive pinion 47 meshes with an output wheel 48 which is likewise part of the transmission 26. The drive pinion 47 and the output wheel 48 have teeth made of plastics material. Advantageously, the drive pinion 47 and the output wheel 48 are made entirely from plastics material. The output wheel 48 is mounted in the housing 11 by way of bearings 50, which are advantageously in the form of anti-friction bearings.

As FIG. 4 shows, the cooling air flows past the transmission 26 in the direction of arrows 39. In the embodiment, the cooling air flows substantially past the output wheel 48. The output wheel 48 is connected to the mowing head 13 so as to rotate therewith and drives the latter in rotation. On that side of the mowing head 13 that faces the housing 11, a second impeller wheel 51 is arranged on the mowing head 13, the second impeller wheel 51 being formed in one piece with the mowing head 13 in the embodiment shown. The second impeller wheel 51 is arranged at the outlet opening 61 from the housing 11. The cooling air flows out of the housing 11 along the arrows 40 through the outlet opening 61. As FIG. 4 also shows, the mowing head 13 carries two outwardly projecting cutting filaments 31.

By way of the pivot joint 15, the housing 11 is pivotable about a pivot axis 34 with respect to the holding connection piece 57 and thus also with respect to the shaft 9. In order to release the pivot joint, use is made of the actuating lever 16, which is spring-mounted by a spring 33 in the direction of its locking position, in which the pivot joint 15 is fixed. The actuating lever 16 acts on pins 32 which interact with depressions (not shown) on the holding connection piece 57 and thus fix the pivot joint 15 in its position. Two pins 32, which are formed in one piece with the actuating lever 16, are provided in the embodiment shown.

Figure 5:
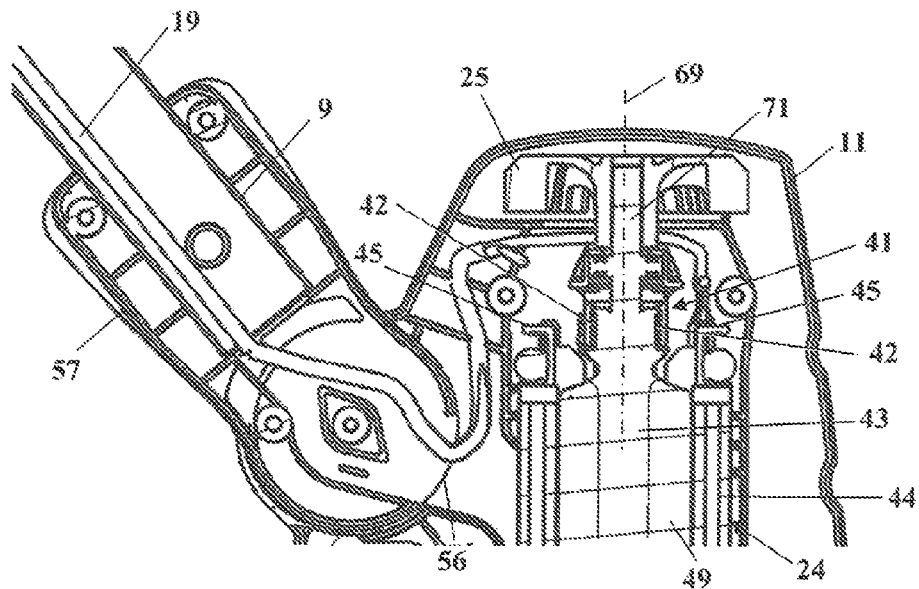

The drive motor 24 is an electric motor which has a commutator 41. The commutator 41 has the brushes 42, shown in FIG. 5, which are in the form of carbon brushes and advantageously consist substantially of graphite. In operation, carbon dust is created at the brushes 42. As FIG. 5 shows, the drive motor 24 has coils 49. In the embodiment shown, the coils 49 are connected to the driveshaft 71 so as to rotate therewith and form part of a rotor 43. After entering the motor housing 35, the cooling air flow flows, as FIG. 4 shows, first of all past the coils 49 and subsequently past the commutator 41. Accordingly the commutator 41 is arranged downstream of the coils 49 in the cooling air flow. The cooling air flow flows out of the motor housing 35 through the exit opening 46 and then conveys the carbon dust created at the brushes 42 to the transmission 26 via the impeller wheel 25. At the transmission 26, the carbon dust is used to lubricate the drive pinion 47 and the output wheel 48 of the transmission 26.

In order to ensure sufficient lubrication of the transmission 26 during first operation immediately after the brush cutter 1 has been produced, it may be practical to provide a quantity of grease 90 as start-up lubrication, for example to provide initial filling of the transmission 26 with a specified amount of grease 90. The grease located in the transmission 26 also binds the carbon dust or graphite dust, thereby improving the retention of the carbon dust or graphite dust in the transmission 26. The initial grease filling 90 thus ensures not only initial lubrication of the transmission 26, but also binds the carbon dust or graphite dust entrained in the air flow, and as a result improved lubrication of the transmission 26 is also achieved in the long term.

Advantageously, the exit opening 46 is arranged at a spacing which is as large as possible from the end side 65. The drive motor 24 has a first imaginary plane 67, which is arranged on that side of the commutator 41 that faces the transmission 26 and extends perpendicularly to the rotation axis 69, and a second imaginary plane, which extends perpendicularly to the rotation axis 69 on that side of the commutator 41 that is remote from the transmission 26. The exit opening 46 is arranged advantageously on that side of the first imaginary plane 67 that is remote from the transmission 26, in particular on that side of the second imaginary plane 68 that is remote from the transmission 26. As a result, the cooling air flow flows at least through a section of the commutator 41, in particular through the entire commutator 41. Advantageously, the cooling air flow flows first past the coils 49 and subsequently past the commutator 41. The cooling air flow directed from the coils 49 to the commutator 41 prevents carbon dust from being able to reach the coils 49. However, it may also be advantageous to arrange the drive motor in a manner rotated through 180° with respect to the shown installation position, such that the commutator 41 is arranged on the side of the coils 49 that faces the transmission 26. In particular in this installation position, it may be advantageous for the cooling air flow to flow first past the commutator 41 and then past the coils 49 so that the motor housing 35 can be formed in a closed manner on the end side 65 and the regions adjoining the latter.

As FIG. 5 shows, the drive motor 24 has two connection terminals 45, to which the connecting line 19 is connected. The internal rotor 43 of the drive motor 24 is mounted in a stator 44. In operation, the rotor 43 rotates with respect to the brushes 42 and as a result creates the carbon dust.

It is understood that the foregoing description is that of the preferred embodiments of the invention and that various changes and modifications may be made thereto without departing from the spirit and scope of the invention as defined in the appended claims.

What is claimed is:

1. A work apparatus comprising:
   a work tool;
   a transmission;
   an electric drive motor for rotatably driving said work tool via said transmission;
   a motor housing defining a flow path for conducting a cooling airflow therealong and a motor housing interior;
   said drive motor being mounted in said motor housing and having a coil and a commutator assembly including a commutator and brushes;
   a fan wheel driven by said drive motor and said fan wheel being configured to move said cooling airflow over said coil and said commutator assembly during operation;
   said motor housing having an end face and an exit opening for passing said cooling airflow out from said motor housing;
   said exit opening being arranged in said flow path downstream of said commutator assembly;
   a transmission housing defining a transmission housing interior;
   said electric drive motor having a drive shaft projecting out of said motor housing at said end face;
   said motor housing having a wall arranged at said end face separating said motor housing interior from said transmission housing interior;
   said motor housing being configured to be closed off toward said transmission housing at said end face;
   a flow connection connecting said motor housing to said transmission housing and configured to conduct at least a portion of said cooling airflow into said transmission housing; and,
   said transmission being arranged in said cooling airflow through said transmission housing.

2. The work apparatus of claim 1, wherein said cooling airflow transports carbon dust of said brushes to said transmission.

3. The work apparatus of claim 1, wherein said transmission includes a plurality of meshing toothed gearwheels; and, at least one of said toothed gearwheels is arranged in said cooling airflow through said transmission housing.

4. The work apparatus of claim 1, wherein said cooling airflow passes first over said coil and then over said commutator assembly.

5. The work apparatus of claim 4, wherein said cooling airflow flows from said coil to said commutator assembly in a first flow direction and flows in a second flow direction in said flow connection in a direction opposite to said first flow direction.

6. The work apparatus of claim 1, wherein said drive motor defines a rotational axis; said drive motor further defines a first imaginary plane disposed at an end of said commutator assembly facing toward said transmission housing and said first imaginary plane extends perpendicular to said rotational axis; said first imaginary plane has a side facing away from said transmission housing; and, said exit opening is arranged on said side of said first imaginary plane.

7. The work apparatus of claim 1, wherein said drive motor defines a rotation axis; said drive motor further defines a second imaginary plane at an end of said commutator assembly facing away from said transmission housing and said second imaginary plane extends perpendicular to said rotation axis; said second imaginary plane has a side facing away from said transmission housing; and, said exit opening is arranged on said side of said second imaginary plane.

8. The work apparatus of claim 1, wherein said flow connection is configured as a connecting channel.

9. The work apparatus of claim 8, wherein said connecting channel has an average length (L) which is at least approximately 5 cm.

10. The work apparatus of claim 1, wherein said coil has an end facing away from said commutator assembly; and, said transmission is arranged at said end of said coil.

11. The work apparatus of claim 1, wherein said transmission includes at least two mutually intermeshed toothed gearwheels having teeth made of plastic.

12. The work apparatus of claim 1, wherein said fan wheel and said transmission are arranged on mutually opposite ends of said drive motor.

13. The work apparatus of claim 1, wherein said fan wheel is arranged adjacent to said exit opening.

14. The work apparatus of claim 1, wherein said fan wheel is arranged at least partially in said connecting channel.

15. The work apparatus of claim 8, wherein said work apparatus further comprises an apparatus housing including at least two half shells; and, said motor housing, said transmission housing and said connecting channel are conjointly formed by said half shells.

16. The work apparatus of claim 1, wherein said motor housing has at least one inlet opening and said transmission housing has at least one outlet opening; said flow connection is configured so as to cause said cooling airflow to enter said motor housing via said inlet opening and to exit from said transmission housing through said outlet opening, said outlet opening of said transmission housing is formed between the rotating work tool and said transmission housing; and, said outlet opening is at least partially delimited by said work tool.

17. The work apparatus of claim 16, wherein said fan wheel is a first fan wheel and said work apparatus further comprises a second fan wheel; said work tool has an end facing toward said transmission housing; and, said second fan wheel is arranged at said end of said work tool.

18. The work apparatus of claim 1, further comprising a handle housing and a shaft connecting said motor housing to said handle housing.

19. The work apparatus of claim 18, wherein said handle housing has at least one air entry opening for cooling air; and, said shaft has an end segment arranged in said handle housing and said end segment has an outer circumference wherein shaft openings are formed for conducting said cooling air drawn in through said entry opening and said shaft openings into said shaft and into said motor housing.

20. The work apparatus of claim 18, wherein said shaft is held so as to be displaceable in said handle housing; said work apparatus further comprises a latching device wherewith said shaft can be fixed in at least two positions relative to said handle housing; and, said latching device coacts with at least one of said shaft openings.

21. A work apparatus comprising:
a work tool;
a transmission;
an electric drive motor for rotatably driving said work tool via said transmission;
a housing having a motor housing and a transmission housing formed therein;
said motor housing defining a flow path for conducting a cooling airflow therealong;
said drive motor being mounted in said motor housing and having a coil and a commutator assembly including a commutator and brushes;
a fan wheel driven by said drive motor and said fan wheel being configured to move said cooling airflow over said coil and said commutator assembly during operation;
said motor housing having an end face and an exit opening for passing said cooling airflow out from said motor housing;
said exit opening being arranged in said flow path downstream of said commutator assembly;
said transmission housing being formed separately from said motor housing;
a transfer channel connecting said transmission housing to said motor housing;
said electric drive motor having a drive shaft projecting out of said motor housing at said end face thereof;
said motor housing having a wall arranged at said end face separating said motor housing from said transmission housing;
said motor housing being configured to be closed off toward said transmission housing at said end face;
said transfer channel being configured to conduct at least a portion of said cooling airflow into said transmission housing; and,
said transmission being arranged in said cooling airflow through said transmission housing.

* * * * *